March 4, 1952 N. WHITEHEAD 2,588,067
IDENTIFICATION CARD
Filed Oct. 28, 1950 2 SHEETS—SHEET 1
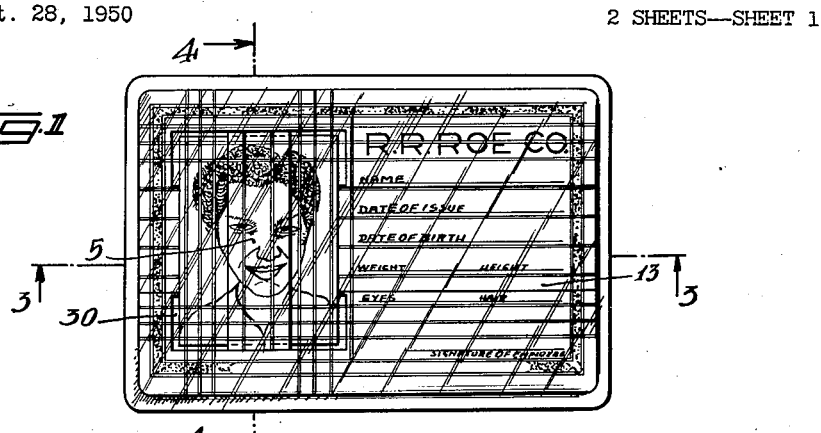
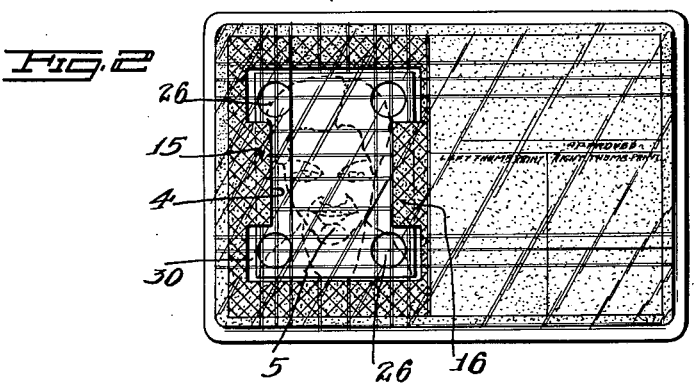
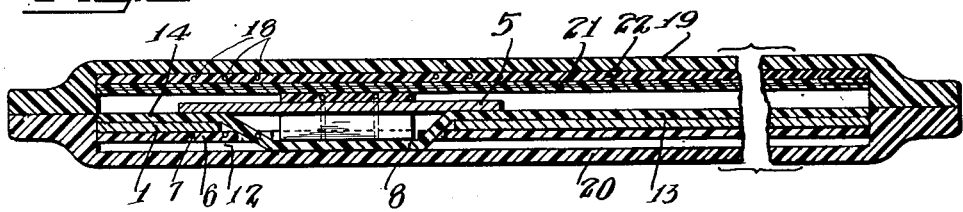
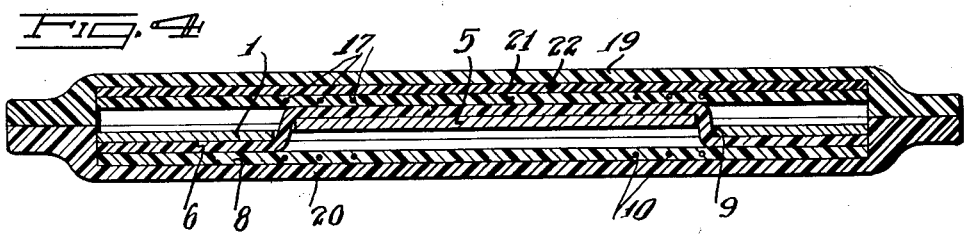
INVENTOR.
Ned Whitehead
BY
Lyon & Lyon
Attorneys

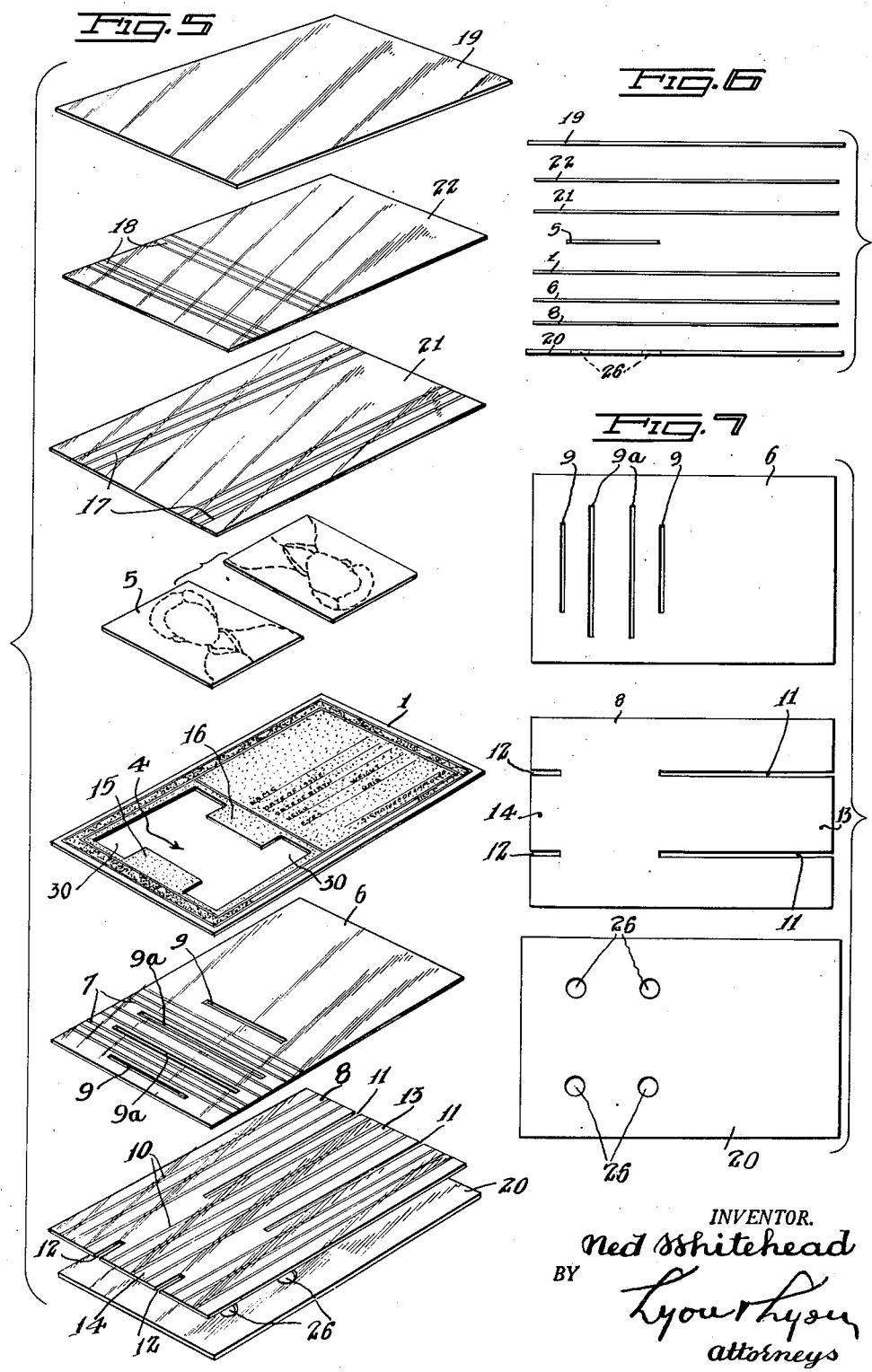

Patented Mar. 4, 1952

2,588,067

UNITED STATES PATENT OFFICE 2,588,067

IDENTIFICATION CARD

Ned Whitehead, Los Angeles, Calif., assignor to Whitehead & Co., Inc., San Juan, Puerto Rico, a corporation of Puerto Rico Application October 28, 1950, Serial No. 192,715

20 Claims. (Cl. 40—2.2)

My invention relates to an identification card and more specifically to an identification card which has the description and photograph of the party to be identified laminated between sheets of clear plastic material and so bonded and interwoven that it is substantially tamper proof.

Identification cards of laminated plastic are old in the art but they do have the difficulty that the outer plastic cover can be cut or melted off, the photograph removed and a new one substituted, or another photograph may be mounted right over the original and a thin sheet of plastic applied thereover and laminated to the old card. Any one of these alterations leaves the card so that an inspector does not notice the mutilation and forgery.

In general, my invention comprises the formation of a paper card or backing on which the descriptive data of the bearer is enclosed. This backing is chemically treated so that upon heating it becomes very brittle and its tensile strength is destroyed. A portion of the backing is cut out, into which cut-out place is positioned a photograph of the bearer. Upon each side of this photograph is a sheet of plastic material in which colored threads are imbedded. This entire assembly is then placed between two sheets of clear thermo-plastic, such as a copolymer of vinyl acetate and vinyl chloride, vinyl acetate or cellulose acetate, and the entire combination is placed under heat and pressure to laminate it into one unit. When an endeavor is made to melt off the outer plastic because the chemical treatment of the paper card has destroyed the fibres therein, it will crumble. If an attempt is made to cut around the photograph and make a substitution, the threads will be cut and it is impossible to re-align the colored threads as during a second laminating process there is always some melting and flowing of the plastic.

Other objects and advantages of this invention will be apparent from the following detailed description of a preferred embodiment thereof.

In the drawings:

Figure 1 is a front plan view of an identification card made in conformance with my invention.

Figure 2 is a rear plan view.

Figure 3 is a sectional view taken on the line 3—3 of Figure 1.

Figure 4 is a sectional view taken on the line 4—4 of Figure 1.

Figure 5 is an exploded perspective.

Figure 6 is an exploded end view.

Figure 7 is an exploded plan view of part of the elements shown, stripped of the threads for clearness of illustration.

An identification card constructed in accordance with my invention comprises a paper backing 1 on which is printed, for example, the name and company 2, and description and signature 3 of the person to be identified. A cut-out portion 4 is placed in the backing to receive a photograph.

The paper backing 1 is treated in the following manner:

To a solution of 100 grams of water is added 18 grams (dry weight) of aluminum sulfate. To another 100 grams of water is added 5 grams of aluminum chloride (dry weight). These two solutions are mixed together in equal volume and to each 100 grams of this combined solution is added 1 gram of a wetting agent with non-ionic characteristics, for example, alkylated aryl poly-ether alcohol. This solution is applied to the backing 1 after the printing or lithographing 2 and 3 has been placed thereon. The temperature of the solution is held to approximately 80° F. The backing 1 is then dried by dry air.

The purpose of this process is to make any alteration of the identification card impossible by destroying the fibre strength of the paper insert during the heating process of lamination and to assure that the paper will remain laminated to the transparent covers when they are heated without pressure. This solution also increases the compatibility of the ink on the paper to the thermo-plastic cover without altering the appearance when the paper strength is destroyed during lamination. When an attempt is made to reseal a card after a first lamination by a second lamination the thermo-plastic material will melt, flow and cause a distortion of the card. As the backing has no fibre strength, the result will be cracking and discoloring, which is readily apparent to an observer. It also prevents resealing by mechanical means because there is no strength in the backing 1 and it will readily absorb any adhesive used, thus causing the face of the card to become smeared or otherwise blemished.

I prefer to have the photograph 5 of the party made on sensitized cloth, which is inserted in the cut-out 4. The photograph also can be on sensitized plastic, such as vinyl acetate or cellulose acetate. These are soluble in ketones or esters. The photograph has the picture of the bearer on both sides of said cloth. An intermediate laminating sheet 6 of clear plastic has imbedded therein a series of vertical gold or other colored threads 7 and has slots 9 and 9a therethrough. Another sheet of plastic 8 has colored threads running horizontally and slots 11 and 12 are cut therein. The tabs 13 and 14 formed by the slots 11 and 12 respectively are inserted in the slots 9 and 9a, and the tabs 15 and 16 on the back 1 placed in the pockets formed between the sheet 6 and the tabs 13 and 14.

The tabs 15 and 16 on the backing 1 overlie the photograph 5 so that any attempt to bodily cut out the entire photograph will cause a contact with the cutting instrument and the backing 1 which will cause it to be destroyed. As I prefer to imprint upon the tabs 15 and 16 an intricate design in ink which is soluble in ketones or esters, it would be impossible to realign the designs upon mechanically inserting a new photograph.

The photograph 5 is placed through the slot 9a in the sheet 6. A pair of front laminating sheets 21 and 22, one of which uses colored threads 17 running horizontally and the other uses colored threads 18 running vertically, are placed upon the above described assembly. This entire assembly is then placed between two outer coverings of plastic material 19 and 20 and this entire assembly then placed in a laminating press where, under heat and pressure, the card is laminated into a unitary structure.

I have found that the same chemical treatment preferably should be given to the colored threads as that used on the paper backing. This destroys the fibres of colored threads and prevents them being realigned upon a second lamination. Also the threads should be given a dye which is soluble in ketones or esters so that if an attempt is made to remove the plastic covers by dissolving in a ketone or other solvent, the dyed threads will run and streak the backing. The threads also can be made of vinyl acetate or copolymer of vinyl acetate and vinyl chloride or cellulose acetate. By constructing them of these materials any attempt to remove the cover by dissolving will dissolve the threads.

In the process of laminating it is desirable to use a platen which has a beat or shoulder on the top surface in order to force down and form a slight shoulder as shown at 25 in Figures 3 and 4 to assure a perfect lamination around the borders of the card.

When an attempt is made to mechanically split the above-described identification card it destroys the paper backing as it has no strength and cannot be relaminated because of the flow of the plastic materials which would have to be placed thereon. If an attempt is made to glue any cover thereon the paper backing 1 will absorb the glue and be disfigured and blemished, making it apparent that it has been tampered with. If an attempt is made to remove the photograph and substitute a new one by splitting either the front sheet 19 or the rear side 20 the colored threads will be destroyed. It is impossible to insert new threads and a new photograph that will align with the other threads in my card. Of course any attempt to merely place a new photograph on the top and laminate a second outer sheet is defeated by the fact that the colored threads show through and are out of line with the threads already in the card.

It should be noted that the photograph 5 is preferably smaller than the cut-out portion 4 in the backing 1 as shown at 30 in Figure 1. Thus, there is a clear view entirely through the card all the way around the photograph and any attempt to align new threads with the threads showing therein would be very apparent to anyone even at a casual examination.

The photograph 5 is impregnated with a thermo-plastic material so as to bond the photograph to the intermediate and cover sheets. When the heat and pressure of lamination is used the photograph, impregnated with the plastic, becomes homogenous with the intermediate and cover sheets and cannot be split and scraped from them for the purpose of substitution.

When the card is laminated it is usual to heat only from one side. The holes 26 in the rear cover sheet 20 permit the plastic sheeting to flow from the heated side to the cold, crimping the colored threads into the rear cover 20 and preventing a slitting of the card from the edge without the destruction of the threads.

Having fully described my invention, it is to be understood that I do not wish to be limited to the details herein set forth, but my invention is of the full scope of the appended claims.

I claim:

1. In an identification card, a paper backing, a cut-out portion in said backing to receive a photograph, a photograph positioned in said cut-out, intermediate transparent thermo-plastic sheets having colored threads imbedded therein, said intermediate sheets positioned so as to encase said photograph on both sides and display colored threads on both sides of said photograph, said colored threads extending across said photograph and over a portion of said backing, and a sealing cover of transparent thermo-plastic.

2. In an identification card, a paper backing, a cut-out portion in said backing to receive a photograph, a photograph positioned in said cut-out, intermediate transparent thermo-plastic sheets having colored threads imbedded therein, said intermediate sheets positioned under said backing and interlacing so as to encase said photograph on both sides and display colored threads on both sides of said photograph, said colored threads extending across said photograph and over a portion of said backing, and a sealing cover of transparent thermo-plastic.

3. In an identification card, a paper backing, a cut-out portion in said backing to receive a photograph, a photograph positioned in said cut-out, intermediate transparent thermo-plastic sheets having colored threads imbedded therein, said intermediate sheets positioned so as to encase said photograph on both sides and display colored threads on both sides of said photograph, said colored threads extending across said photograph and over a portion of said backing, and a sealing cover of transparent thermo-plastic, said paper backing having its tensile strength destroyed.

4. In an identification card, a paper backing, a cut-out portion in said backing to receive a photograph, a photograph positioned in said cut-out, intermediate transparent thermo-plastic sheets having colored threads imbedded therein, said intermediate sheets positioned under said backing and interlacing so as to encase said photograph on both sides and display colored threads on both sides of said photograph, said colored threads extending across said photograph and over a portion of said backing, and a sealing cover of transparent thermo-plastic, said paper backing having its tensile strength destroyed.

5. An identification card comprising the following components laminated together under heat and pressure: a paper backing, a cut-out portion in said backing to receive a photograph, a photograph positioned in said cut-out, intermediate transparent thermo-plastic sheets having colored threads imbedded therein, said intermediate sheets positioned so as to encase said photograph on both sides and display colored threads on both sides of said photograph, said colored threads extending across said photograph and over a portion of said backing, and a sealing cover of transparent thermo-plastic.

6. An identification card comprising the following components laminated together under heat and pressure: a paper backing, a cut-out portion in said backing to receive a photograph, a photograph positioned in said cut-out, intermediate transparent thermo-plastic sheets having colored threads imbedded therein, said intermediate sheets positioned under said backing and interlacing so as to encase said photograph on both sides and display colored threads on both sides of said photograph, said colored threads extending across said photograph and over a portion of said backing, and a sealing cover of transparent thermo-plastic.

7. An identification card comprising the following components laminated together under heat and pressure: a paper backing, a cut-out portion in said backing to receive a photograph, a photograph positioned in said cut-out, intermediate transparent thermo-plastic sheets having colored threads imbedded therein, said intermediate sheets positioned so as to encase said photograph on both sides and display colored threads on both sides of said photograph, said colored threads extending across said photograph and over a portion of said backing, and a sealing cover of transparent thermo-plastic, said paper backing having its tensile strength destroyed.

8. An identification card comprising the following components laminated together under heat and pressure: a paper backing, a cut-out portion in said backing to receive a photograph, a photograph positioned in said cut-out, intermediate transparent thermo-plastic sheets having colored threads imbedded therein, said intermediate sheets positioned under said backing and interlacing so as to encase said photograph on both sides and display colored threads on both sides of said photograph, said colored threads extending across said photograph and over a portion of said backing, and a sealing cover of transparent thermo-plastic, said paper backing having its tensile strength destroyed.

9. In an identification card, a paper backing, a cut-out portion in said backing to receive a photograph, a photograph positioned in said cut-out, intermediate transparent thermo-plastic sheets having colored threads imbedded therein, said intermediate sheets positioned so as to encase said photograph on both sides and display colored threads on both sides of said photograph, said colored threads extending across said photograph and over a portion of said backing, and a sealing cover of transparent thermo-plastic, said paper backing having its tensile strength destroyed by chemical additives to said paper.

10. An identification card comprising the following components laminated together under heat and pressure: a paper backing, a cut-out portion in said backing to receive a photograph, a photograph positioned in said cut-out, intermediate transparent thermo-plastic sheets having colored threads imbedded therein, said intermediate sheets positioned so as to encase said photograph on both sides and display colored threads on both sides of said photograph, said colored threads extending across said photograph and over a portion of said backing, and a sealing cover of transparent thermo-plastic, said paper backing having its tensile strength destroyed by chemical additives to said paper.

11. In an identification card, a paper backing, a cut-out portion in said backing to receive a photograph, a photograph positioned in said cut-out, intermediate transparent thermo-plastic sheets having colored threads imbedded therein, said intermediate sheets positioned so as to encase said photograph on both sides and display colored threads on both sides of said photograph, said colored threads extending across said photograph and over a portion of said backing, and a sealing cover of transparent thermo-plastic, said photograph being impregnated with a thermo-plastic material.

12. In an identification card, a paper backing, a cut-out portion in said backing to receive a photograph, a photograph positioned in said cut-out, intermediate transparent thermo-plastic sheets having colored threads imbedded therein, said intermediate sheets positioned under said backing and interlacing so as to encase said photograph on both sides and display colored threads on both sides of said photograph, said colored threads extending across said photograph and over a portion of said backing, and a sealing cover of transparent thermo-plastic, said photograph being impregnated with a thermo-plastic material.

13. In an identification card, a paper backing, a cut-out portion in said backing to receive a photograph, a photograph positioned in said cut-out, intermediate transparent thermo-plastic sheets having colored threads imbedded therein, said intermediate sheets positioned so as to encase said photograph on both sides and display colored threads on both sides of said photograph, said colored threads extending across said photograph and over a portion of said backing, and a sealing cover of transparent thermo-plastic, said paper backing having its tensile strength destroyed, said photograph being impregnated with a thermo-plastic material.

14. In an identification card, a paper backing, a cut-off portion in said backing to receive a photograph, a photograph positioned in said cut-out, intermediate transparent thermo-plastic sheets having colored threads imbedded therein, said intermediate sheets positioned under said backing and interlacing so as to encase said photograph on both sides and display colored threads on both sides of said photograph, said colored threads extending across said photograph and over a portion of said backing, and a sealing cover of transparent thermo-plastic, said paper backing having its tensile strength destroyed, said photograph being impregnated with a thermo-plastic material.

15. An identification card comprising the following components laminated together under heat and pressure: a paper backing, a cut-out portion in said backing to receive a photograph, a photograph positioned in said cut-out, intermediate transparent thermo-plastic sheets having colored threads imbedded therein, said intermediate sheets positioned so as to encase said photograph on both sides and display colored threads on both sides of said photograph, said colored threads extending across said photograph and over a portion of said backing, and a sealing cover of transparent thermo-plastic, said paper backing having its tensile strength destroyed by chemical additives to said paper, said photograph being impregnated with a thermo-plastic material.

16. In an identification card, a paper backing, a cut-out portion in said backing to receive a photograph, a photograph smaller than said cut-out positioned in said cut-out, intermediate transparent thermo-plastic sheets having colored threads imbedded therein, said intermediate sheets positioned so as to encase said photograph on both sides and display colored threads on both sides of said photograph, said colored threads extending across said photograph and over a portion of said backing, and a sealing cover of transparent thermo-plastic.

17. An identification card comprising the following components laminated together under heat and pressure: a paper backing, a cut-out portion in said backing to receive a photograph, a photograph positioned in said cut-out, intermediate transparent thermo-plastic sheets having colored threads imbedded therein, said intermediate sheets positioned so as to encase said photograph on both sides and display colored threads on both sides of said photograph, said colored threads extending across said photograph and over a portion of said backing, and a sealing cover of transparent thermo-plastic, said paper and said threads having their tensile strength destroyed.

18. An identification card comprising the following components laminated together under heat and pressure: a paper backing, a cut-out portion in said backing to receive a photograph, a photograph smaller than said cut-out positioned in said cut-out, intermediate transparent thermo-plastic sheets having colored threads imbedded therein, said intermediate sheets positioned so as to encase said photograph on both sides and display colored threads on both sides of said photograph, said colored threads extending across said photograph and over a portion of said backing, and a sealing cover of transparent thermo-plastic, said paper and said threads having their tensile strength destroyed.

19. In an identification card, a paper backing, a cut-out portion in said backing to receive a photograph, a photograph smaller than said cut-out positioned in said cut-out, intermediate transparent thermo-plastic sheets having colored threads imbedded therein, said intermediate sheets positioned so as to encase said photograph on both sides and display colored threads on both sides of said photograph, said colored threads extending across said photograph and over a portion of said backing, and a sealing cover of transparent thermo-plastic, said colored threads being dyed with a ketone or ester soluble dye.

20. In an identification card, a paper backing, a cut-out portion in said backing to receive a photograph, a photograph smaller than said cut-out positioned in said cut-out, intermediate transparent thermo-plastic sheets having colored threads imbedded therein, said intermediate sheets positioned so as to encase said photograph on both sides and display colored threads on both sides of said photograph, said colored threads extending across said photograph and over a portion of said backing, and a sealing cover of transparent thermo-plastic or ester, said threads themselves being soluble in ketones or esters.

NED WHITEHEAD.

REFERENCES CITED

The following references are of record in the file of this patent:

UNITED STATES PATENTS

| Number | Name | Date |
| --- | --- | --- |
| 2,088,567 | Ballou | Aug. 3, 1937 |
| 2,361,670 | Whitehead | Oct. 31, 1944 |
| 2,545,804 | Butler | Mar. 20, 1951 |